(12) United States Patent
Liu

(10) Patent No.: US 11,904,633 B2
(45) Date of Patent: Feb. 20, 2024

(54) FREEHUB OF BICYCLE

(71) Applicant: Wei-Ting Liu, Taichung (TW)

(72) Inventor: Wei-Ting Liu, Taichung (TW)

( * ) Notice: Subject to any disclaimer, the term of this patent is extended or adjusted under 35 U.S.C. 154(b) by 379 days.

(21) Appl. No.: 17/230,042

(22) Filed: Apr. 14, 2021

(65) Prior Publication Data

US 2022/0332143 A1 Oct. 20, 2022

(51) Int. Cl.
*F16D 41/24* (2006.01)
*B60B 27/04* (2006.01)
*B60B 27/02* (2006.01)

(52) U.S. Cl.
CPC .......... *B60B 27/047* (2013.01); *B60B 27/023* (2013.01); *F16D 41/24* (2013.01)

(58) Field of Classification Search
CPC ..... B60B 27/047; B60B 27/023; F16D 41/24; F16D 41/28; F16D 41/32
See application file for complete search history.

(56) References Cited

U.S. PATENT DOCUMENTS 10,508,697 B2 * 12/2019 Carrasco Vergara ... F16D 41/32

* cited by examiner

*Primary Examiner* — Huan Le
(74) *Attorney, Agent, or Firm* — Rosenberg, Klein & Lee

(57) ABSTRACT

A freehub of a bicycle contains: a body fitted and rotating on a rotary shaft. A receiving sleeve is connected with the body and fitted on the rotary shaft, and the receiving sleeve includes an accommodation holder configured to accommodate a freewheel. A ratchet assembly is mounted between the body and the receiving sleeve, the ratchet assembly includes multiple chutes, and a central axis of a respective chute is not parallel to a central axis of the rotary shaft. A toothed ring is fitted between the fixing element and the body. The ratchet assembly includes multiple teeth, multiple engagement elements, and multiple resilient elements. A respective resilient element abuts against the respective chute and a respective engagement element, such that the respective engagement element is urged by the respective resilient element to linearly move toward the respective tooth so as to engage with the respective tooth.

18 Claims, 13 Drawing Sheets

US 11,904,633 B2

FREEHUB OF BICYCLE

FIELD OF THE INVENTION

The present invention relates to a freehub of a bicycle which contains a body actuated to rotate in a direction merely by a chain transmission device, and the body rotates idly in the other direction.

BACKGROUND OF THE INVENTION

A ratchet mechanism of a bicycle contains: a toothed ring, multiple teeth, multiple engagement elements, and multiple resilient elements, wherein the multiple teeth are formed on an accommodation holder, and the multiple teeth are formed on an inner wall of the toothed ring, the multiple engagement elements are rotatably connected with the accommodation holder, wherein the multiple resilient elements push the multiple engagement elements to rotatably engage with the multiple teeth.

The engagement elements are engagement paws or engagement protrusions, wherein when a respective engagement element is an engagement paw, a single tooth is formed on the toothed ring. When the respective engagement element is an engagement protrusion, at least two teeth are formed on the toothed ring.

Furthermore, the respective tooth is formed on an outer wall or an inner wall of the toothed ring so as to engage with the respective engagement element.

The respective engagement element rotatably or linearly engages with the respective tooth.

The present invention has arisen to mitigate and/or obviate the afore-described disadvantages.

SUMMARY OF THE INVENTION

The primary aspect of the present invention is to provide a freehub of a bicycle which contains multiple engagement elements formed in a column shape, and multiple teeth have multiple arcuate faces, such that multiple engagement elements contact with multiple teeth securely so as to enhance a driving force of the freehub.

Secondary aspect of the present invention is to provide a freehub of a bicycle which contains the respective engagement element engaged with the respective tooth to move linearly, and the linear direction of the respective chute is not parallel to the central axis of the rotary shaft, thus enhancing the driving force of the freehub.

Third aspect of the present invention is to provide a freehub of a bicycle which contains the respective engagement element moving linearly to engage with or remove from the respective tooth quickly.

Further aspect of the present invention is to provide a freehub of a bicycle which contains the respective engagement element moving linearly to engage with or to remove from the respective tooth, thus reducing a loss of the driving force of the freehub and avoiding interference between the respective engagement element and the respective tooth.

Another aspect of the present invention is to provide a freehub of a bicycle which contains the respective tooth engaging with an inner wall of the respective toothed ring and moving forward to the bicycle at the inclined angle θ, thus enhancing a rotating speed of the wheel.

To obtain above-mentioned aspect, a freehub of a bicycle provided by the present invention contains: a body, a receiving sleeve, a ratchet assembly, and a toothed ring.

The body is fitted and rotates on a rotary shaft.

The receiving sleeve is connected with a first end of the body and is fitted on the rotary shaft, and the receiving sleeve includes an accommodation holder configured to accommodate a freewheel.

The ratchet assembly is mounted between the body and the receiving sleeve, and the ratchet assembly includes multiple chutes defined thereon and corresponding to the body. A central axis of a respective chute is not parallel to a central axis of the rotary shaft.

The toothed ring is fitted between the fixing element and the body, and the ratchet assembly further includes multiple teeth formed on the toothed ring opposite to the multiple chutes. Preferably, a respective tooth has an arcuate face.

The ratchet assembly further includes multiple engagement elements formed in a column shape and corresponding to the multiple teeth, such that the multiple engagement elements abut against the multiple teeth, when the multiple engagement elements engage with the multiple teeth.

The ratchet assembly further includes multiple resilient elements, and a respective resilient element abuts against the respective chute and a respective engagement element, such that the respective engagement element is urged by the respective resilient element to linearly move toward the respective tooth so as to engage with the respective tooth.

DETAILED DESCRIPTION OF THE PREFERRED EMBODIMENTS

Figure 1:
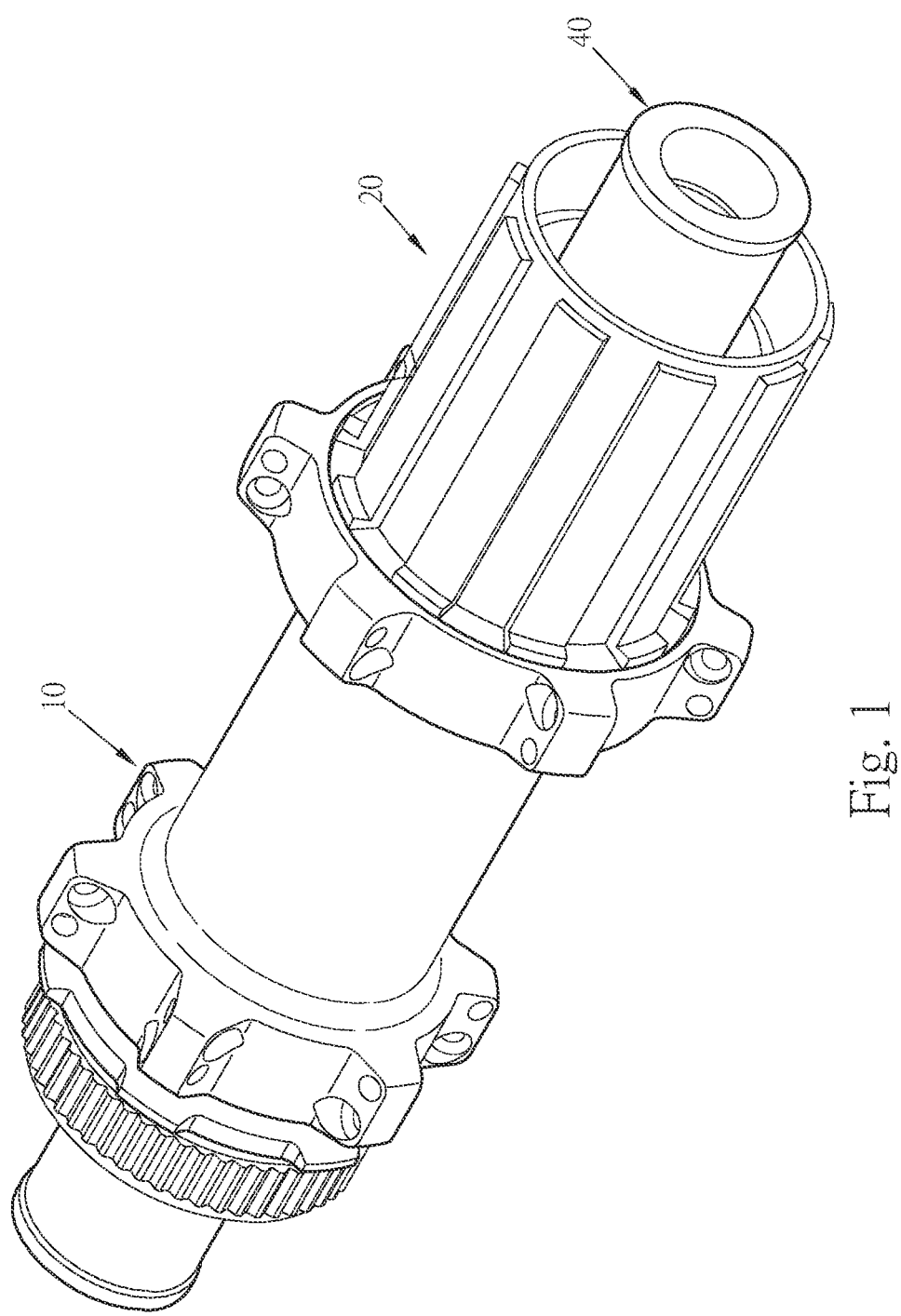
FIG. 1 is a perspective view showing the assembly of a freehub of a bicycle according to a first embodiment of the present invention.
Figure 2:
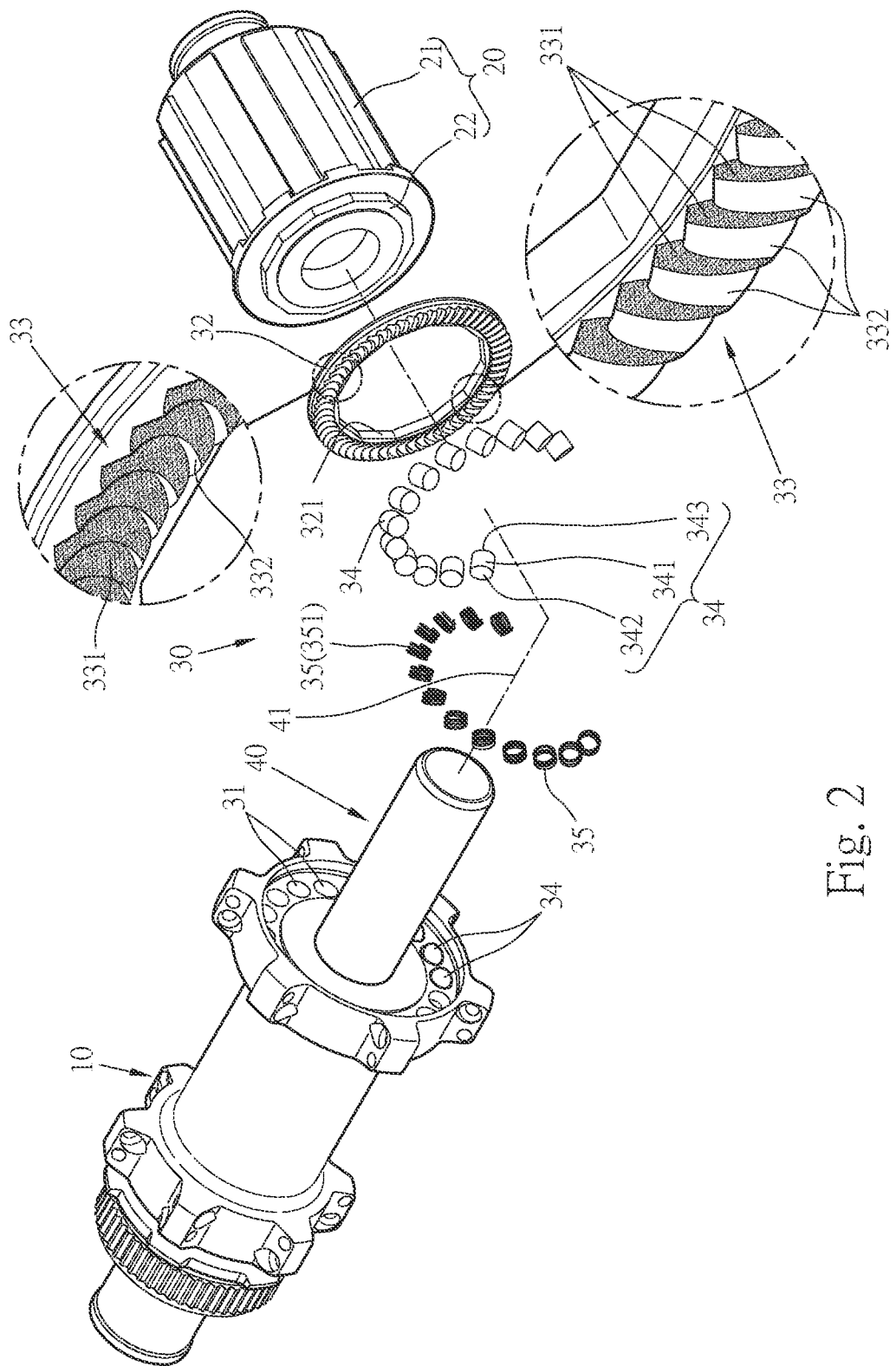
FIG. 2 is a perspective view showing the exploded components of the freehub of the bicycle according to the first embodiment of the present invention.
Figure 3:
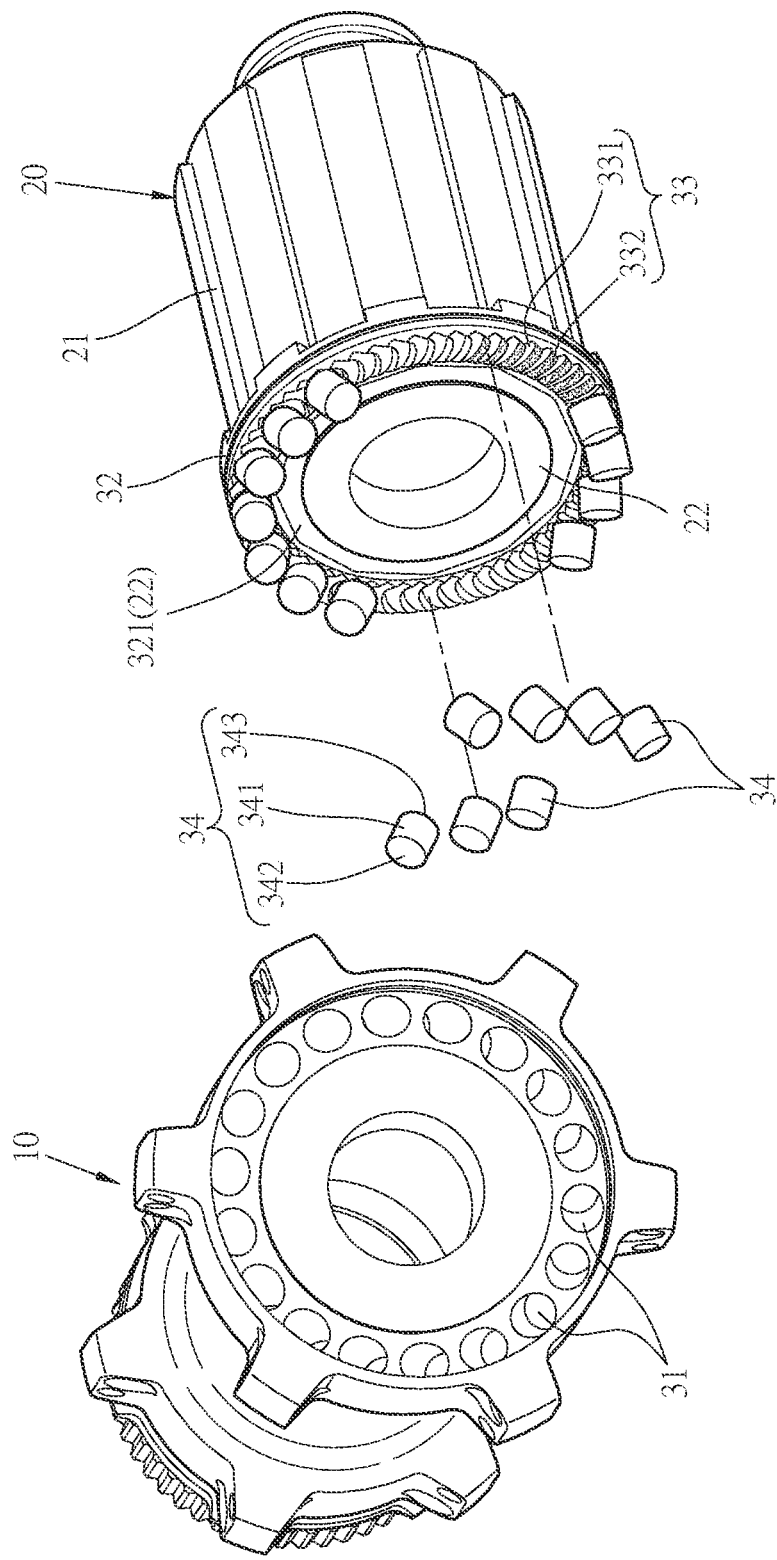
FIG. 3 is another perspective view showing the exploded components of the freehub of the bicycle according to the first embodiment of the present invention.
Figure 4:
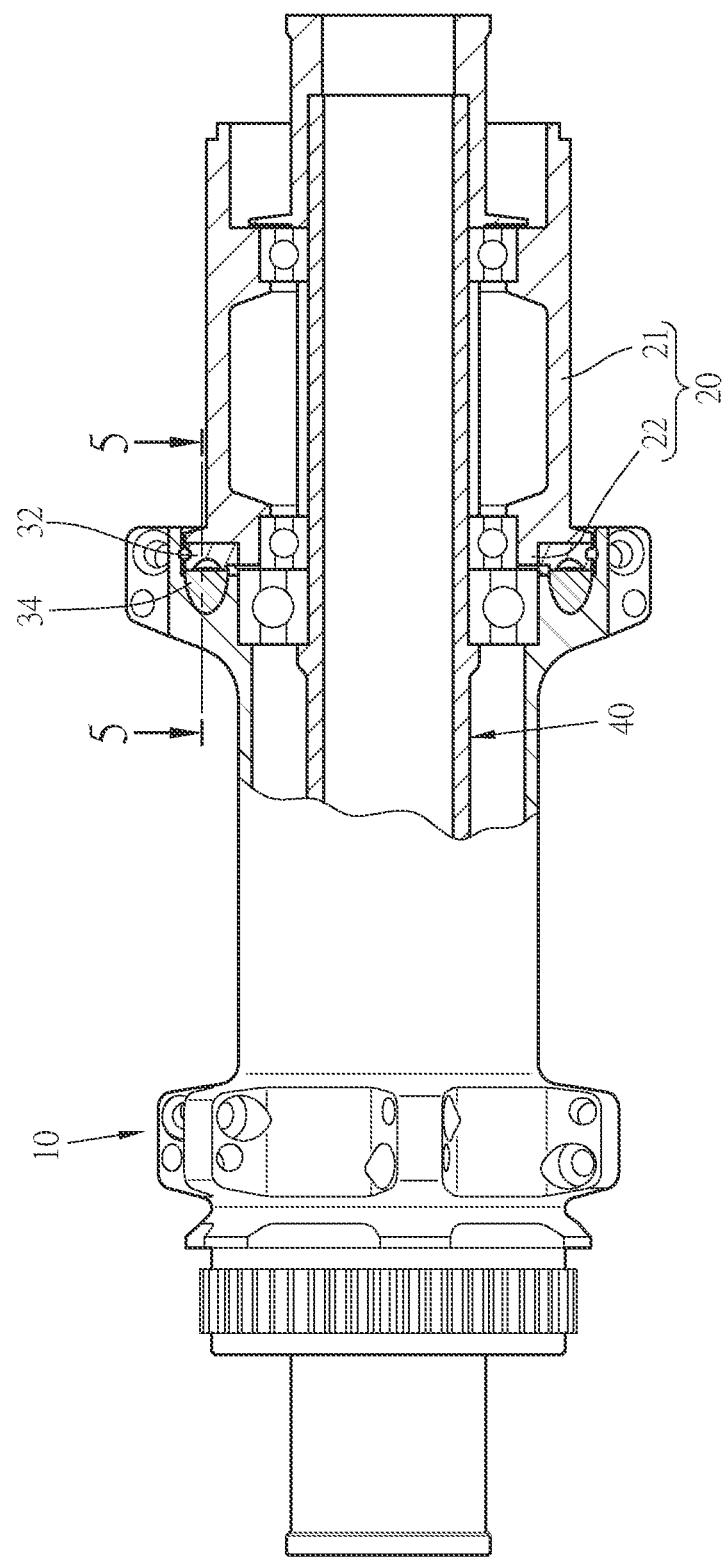
FIG. 4 is a cross sectional view showing the assembly of the freehub of the bicycle according to the first embodiment of the present invention.
Figure 5:
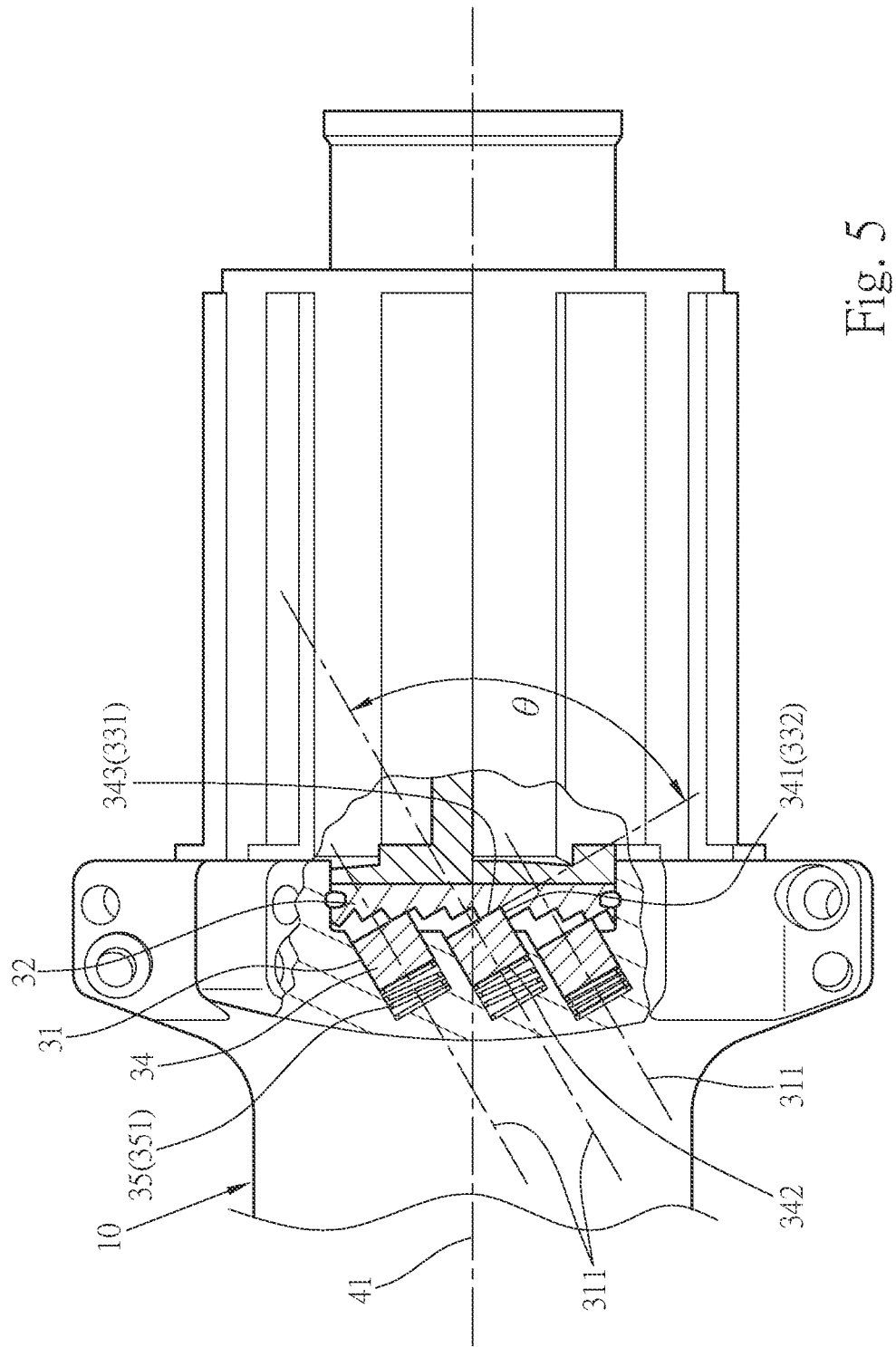
FIG. 5 is another cross sectional view showing the assembly of the freehub of the bicycle according to the first embodiment of the present invention.

With reference to FIGS. 1-5, a freehub of a bicycle according to a first emdboimdnet of the present invention comprises: a body 10, a receiving sleeve 20 connected with a first end of the body 10, and a ratchet assembly 30 received in the receiving sleeve 20.

The body 10 is fitted and rotates on a rotary shaft 40.

The receiving sleeve 20 is connected with the first end of the body 10 and is fitted on the rotary shaft 40, and the receiving sleeve 20 includes an accommodation holder 21 configured to accommodate a freewheel (not shown), the receiving sleeve 20 also includes a fixing element 22 corresponding to a second end of the body 10 and formed in a polygon shape.

The ratchet assembly 30 is mounted between the body 10 and the receiving sleeve 20, and the ratchet assembly 30 includes multiple chutes 31 defined thereon and corresponding to the body 10, wherein a central axis of a respective chute 31 is not parallel to a central axis 41 of the rotary shaft 41, and the respective chute 31 has a linear direction 311.

A toothed ring 32 is fitted between the fixing element 22 and the body 10, and the toothed ring 32 has a polygonal orifice 321 defined on a center thereof and fitted with the fixing element 22, wherein the ratchet assembly 30 further includes multiple teeth 33 formed on the toothed ring 32 opposite to the multiple chutes 31, wherein a respective tooth 33 has an arcuate face 331 and a tilted face 332 connected with the first resilient element face 331.

The ratchet assembly 30 includes multiple engagement elements 34 formed in a column shape and corresponding to the multiple teeth 33, such that the multiple engagement elements 34 abut against multiple arcuate faces 331 of the multiple teeth 33, when the multiple engagement elements 34 engage with the multiple teeth 33. The ratchet assembly 30 further includes multiple resilient elements 35, wherein a respective resilient element 35 abuts against the respective chute 31 and a respective engagement element 34, such that the respective engagement element 34 is urged by the respective resilient element 35 to linearly move toward the respective tooth 33 so as to engage with the respective tooth 33, wherein the respective resilient element 35 is a spring 351, and a first end of the spring 351 abuts against a first edge 342 of the respective engagement element 34 and a bottom of the respective chute 31. The respective engagement element 34 has a peripheral fringe 341, the first edge 342, and a second edge 343 opposite to the first edge 341, wherein the first edge 341 of the respective engagement element 34 contacts with the respective resilient element 35, and the second edge 343 and a part of the peripheral fringe 341 are exposed outside the respective chute 31. The linear direction 311 of the respective chute 31 is a linear moving direction of the respective engagement element 34, and an inclined angle θ is defined between the linear moving direction of the respective engagement element 34 and the tilted face 332 of the respective chute 31, wherein the inclined angle θ is 90 degrees. When the respective engagement element 34 engages with the respective tooth 33, the part of the peripheral fringe 341 exposed outside the respective chute 31 contacts with the respective arcuate face 331, and the second edge 343 exposed outside the respective chute 31 abuts against the tilted face 332. When the respective engagement element 34 contacts with the tilted face 332, the respective engagement element 34 rotates idly so that the tilted face 332 pushes the respective engagement element 34 toward the respective chute 34 linearly.

Thereby, the respective engagement element 34 moves linearly at the inclined angle θ to engage with or remove from the respective tooth 33 easily.

Figure 6:
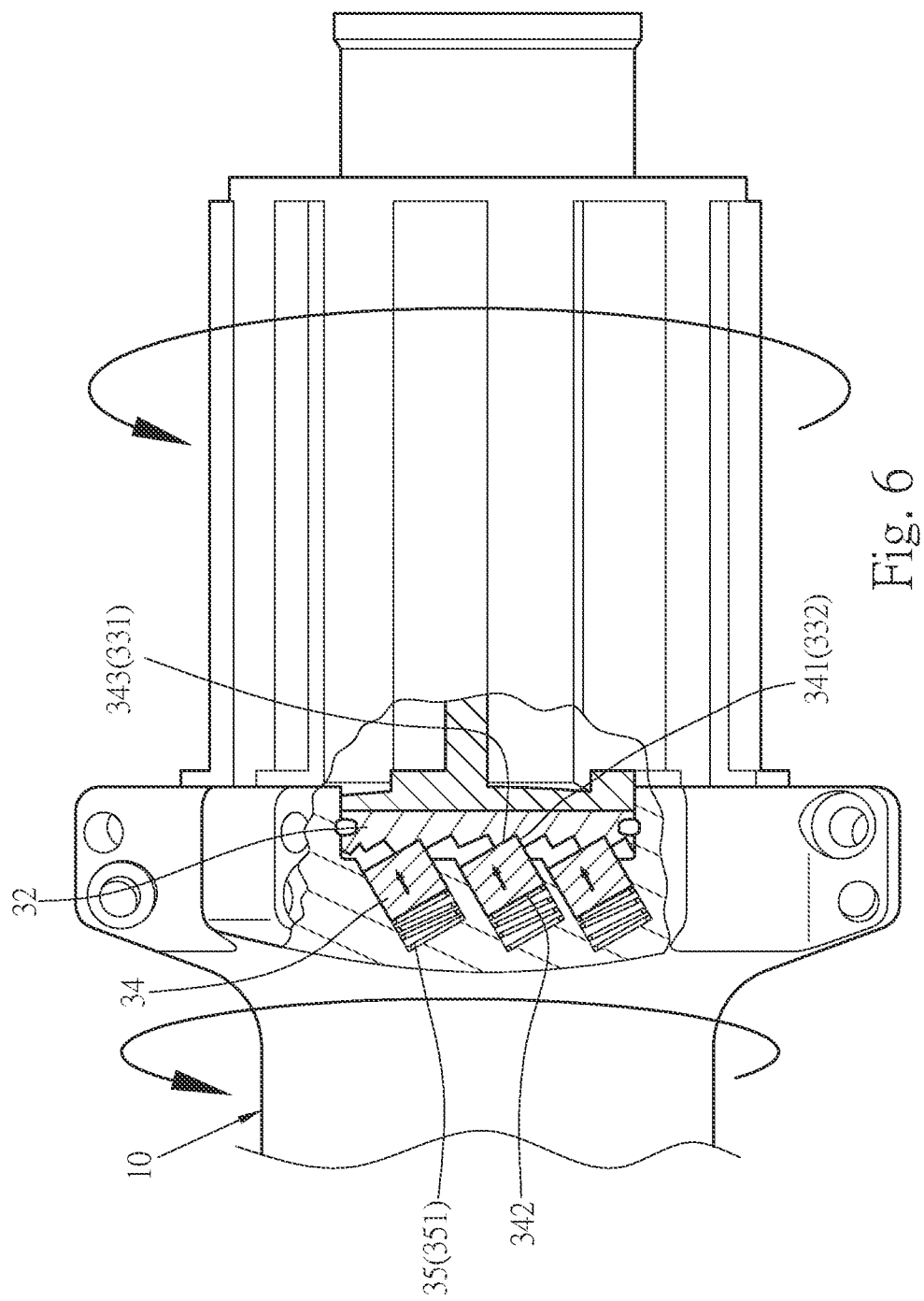
FIG. 6 is a cross sectional view showing the operation of the freehub of the bicycle according to the first embodiment of the present invention.

Referring to FIG. 6, the respective engagement element 34 is pushed by the respective resilient element 35 to move toward the respective tooth 33. When the receiving sleeve 20 is actuated, the receiving sleeve 20 rotates with the toothed ring 32 simultaneously. When the toothed ring 32 rotates and the respective engagement element 34 is engaged with the respective tooth 33, the respective engagement element 34, the ratchet assembly 30, and the receiving sleeve 20 are driven by the toothed ring 32 to rotate forward to the bicycle, thus driving a wheel of the bicycle to rotate forward.

Figure 7:
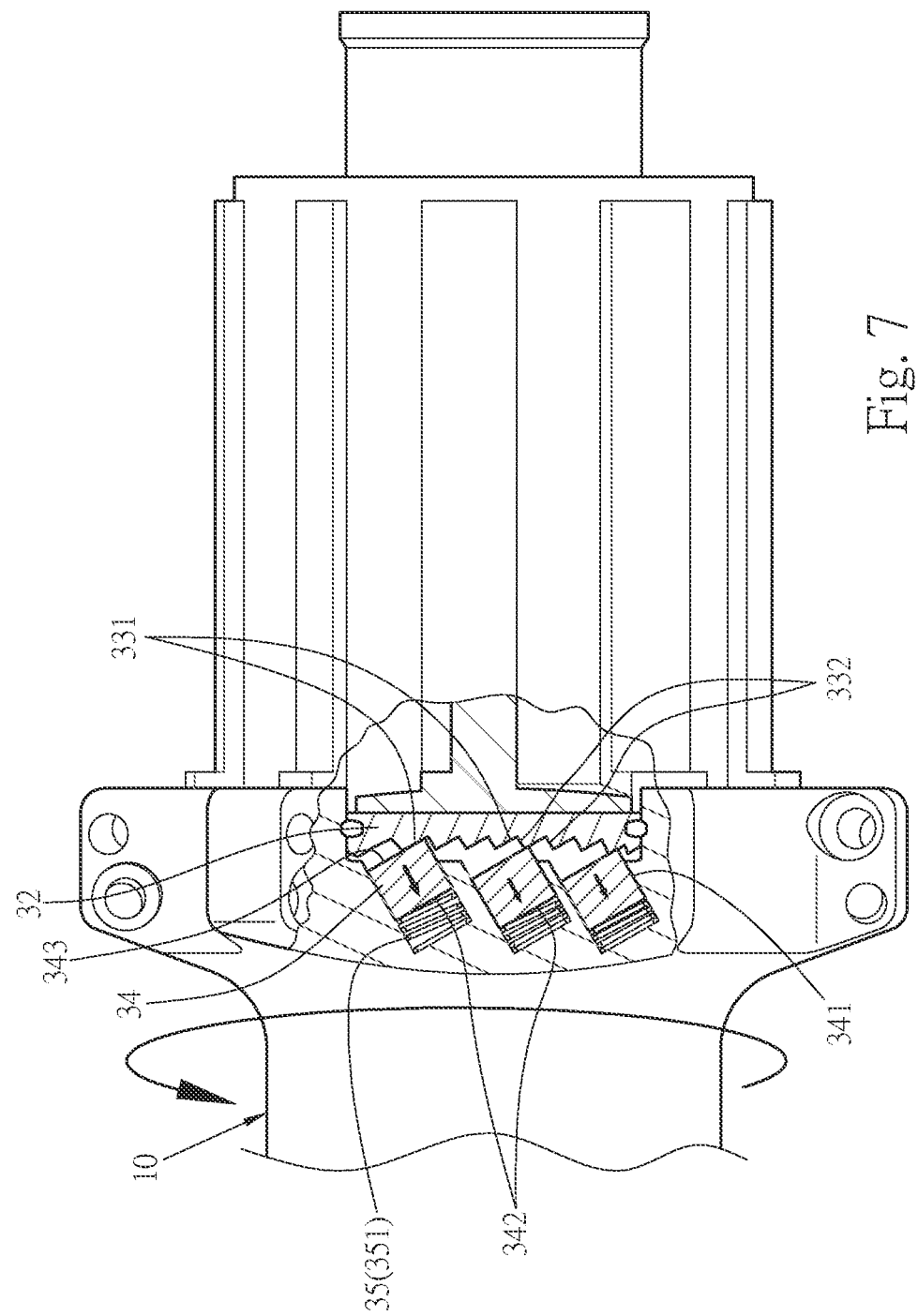
FIG. 7 is another cross sectional view showing the operation of the freehub of the bicycle according to the first embodiment of the present invention.

As shown in FIG. 7, the respective engagement element 34 is forced by the respective resilient element 35 to move toward the respective tooth 33, and when the receiving sleeve 20 stops rotation, the toothed ring 32 stops rotation with the receiving sleeve 20, wherein the respective engagement element 34, the ratchet assembly 30, and the receiving sleeve 20 still rotate forward so that the respective engagement element 34 is pushed by the tilted face 332 to remove from the respective tooth 33. After the respective engagement element 34 is not pushed by the tilted face 332, the respective engagement element 34 moves backward to contact with a next tilted face 332, such that the respective engagement element 34 engages with and removes from the respective tooth 33 repeatedly to make noise but not rotate idly, in the meantime, the wheel rotates forward.

Figure 8:
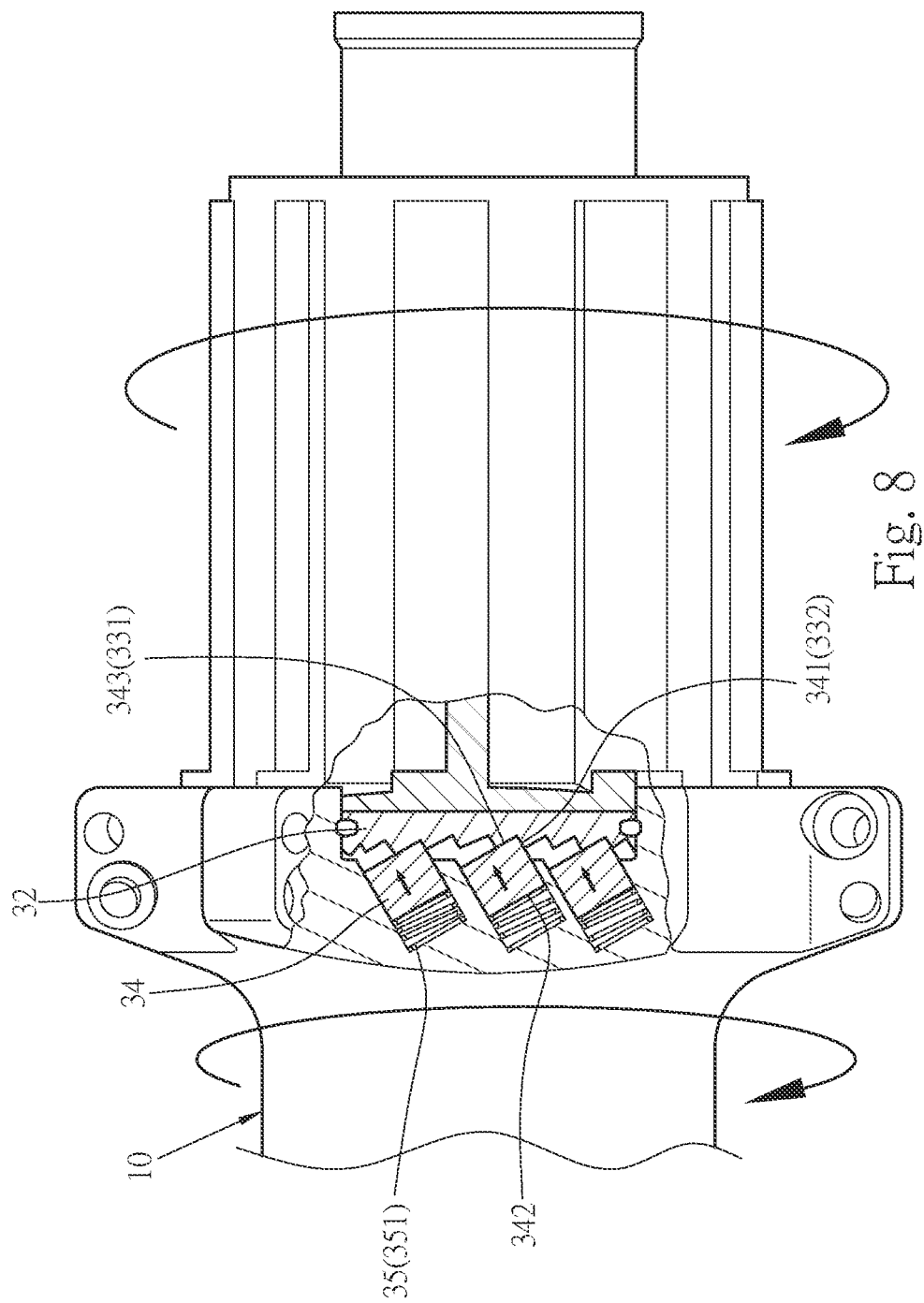
FIG. 8 is also another cross sectional view showing the operation of the freehub of the bicycle according to the first embodiment of the present invention.

As illustrated in FIG. 8, the respective engagement element 34 engages with the respective tooth 33 and the wheel rotate backward so that the body 10 revolves backward and drives the respective engagement element 34, the ratchet assembly 30, and the receiving sleeve 20 to rotate backward, and the wheel rotates backward.

Thereby, the respective engagement element 34 moves linearly at the inclined angle θ to engage with or remove from the respective tooth 33 easily.

The freehub of a bicycle also has advantages as follows:

1. The respective engagement element 34 is formed in the column shape, and the respective tooth 33 has the arcuate face 331, such that the respective engagement element 34 contacts with the respective tooth 33 so as to enhance a driving force of the freehub.

2. The respective engagement element 34 is engaged with the respective tooth 33 to move linearly, and the linear direction 311 of the respective chute 31 is not parallel to a central axis 41 of the rotary shaft 41, thus enhancing the driving force of the freehub.

3. The respective engagement element 34 moves linearly to engage with or remove from the respective tooth 33 quickly.

4. The respective engagement element 34 moves linearly to engage with or remove from the respective tooth 33, thus reducing a loss of the driving force of the freehub and avoiding interference between the respective engagement element 34 and the respective tooth 33.

5. The respective tooth 33 engages with an inner wall of the toothed ring 32 and moves forward at the inclined angle θ, thus enhancing a rotating speed of the wheel.

Figure 9:
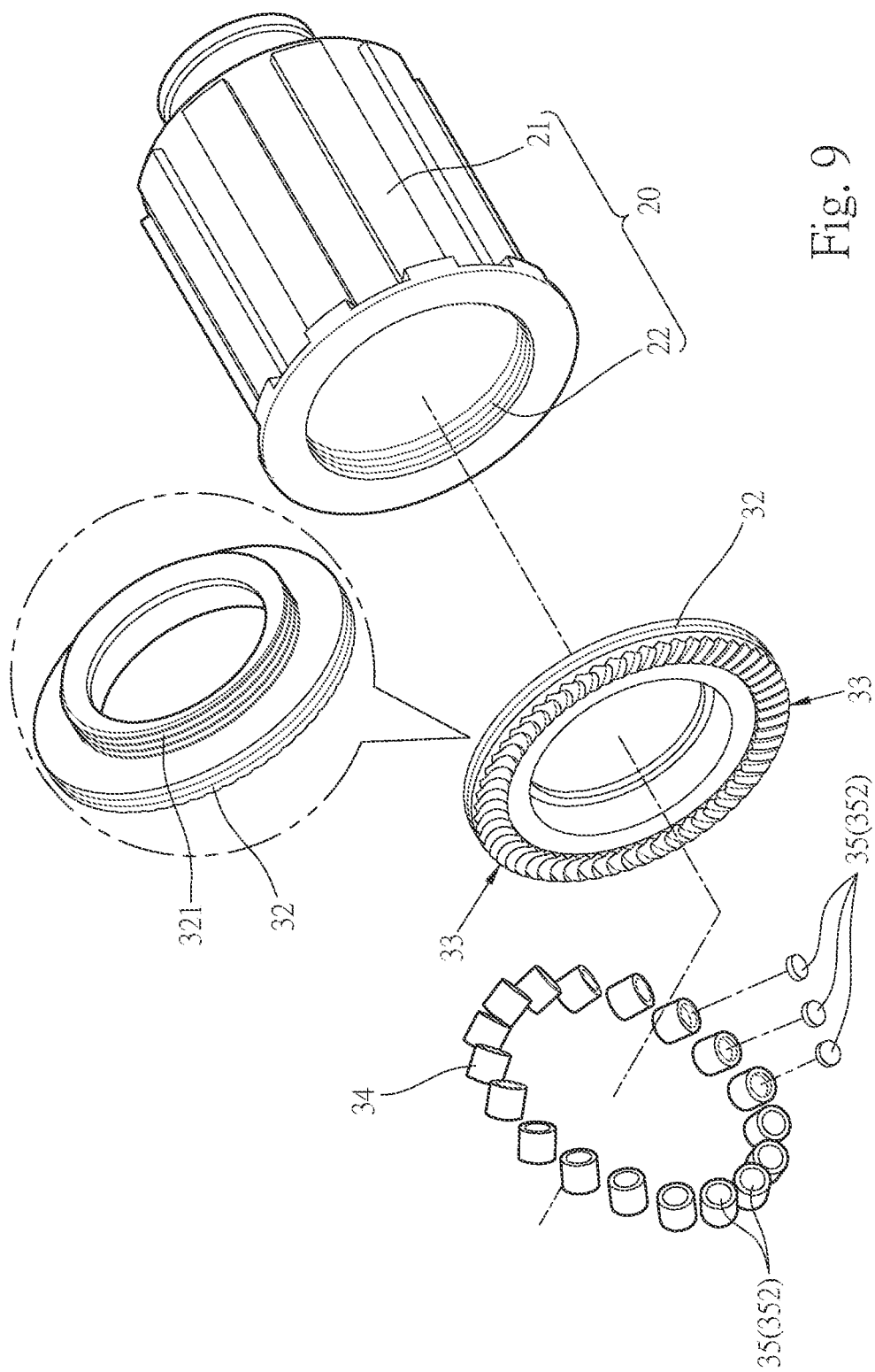
FIG. 9 is a perspective view showing the assembly of a freehub of a bicycle according to a second embodiment of the present invention.
Figure 10:
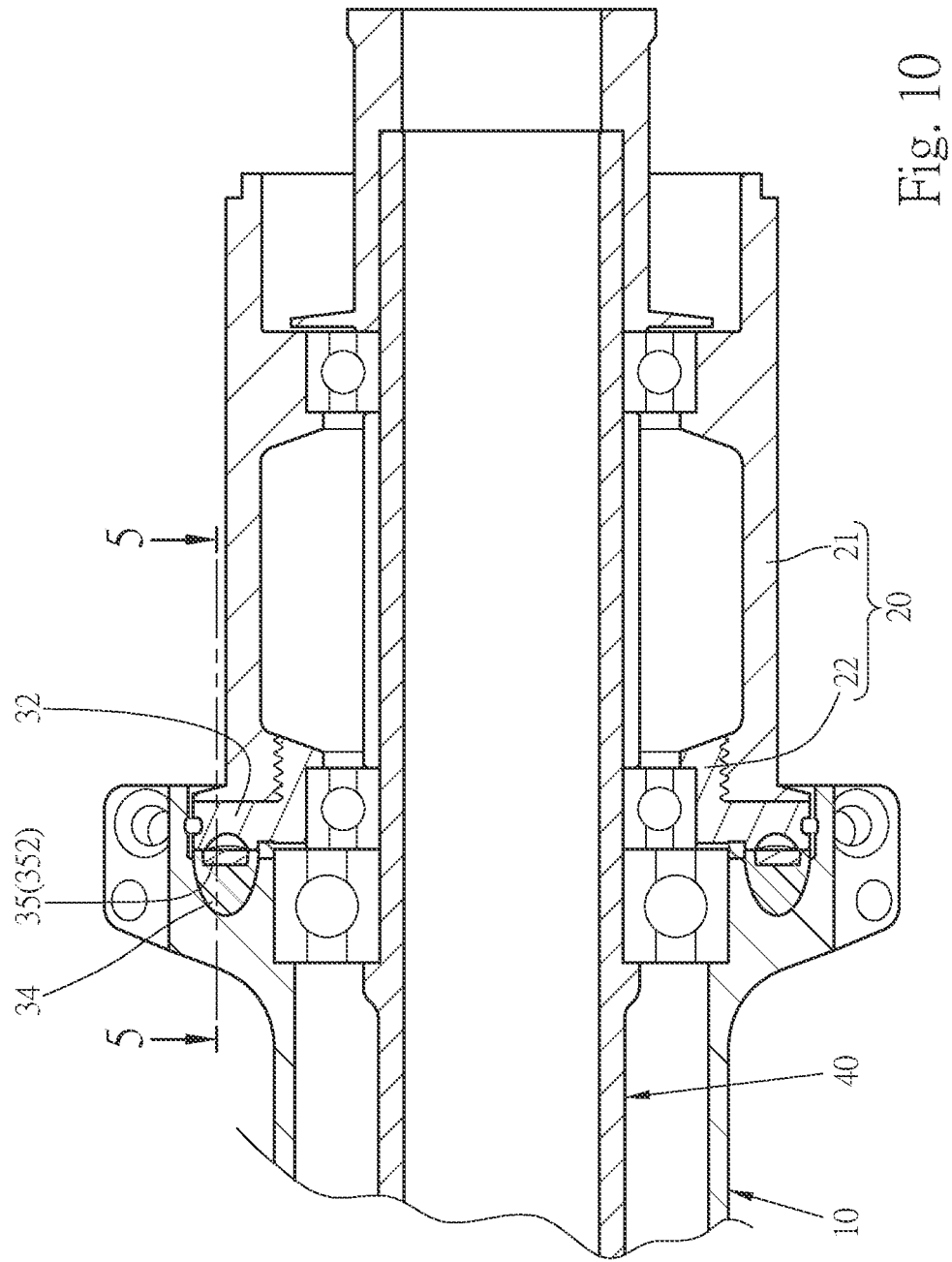
FIG. 10 is a cross sectional view showing the assembly of the freehub of the bicycle according to the second embodiment of the present invention.
Figure 11:
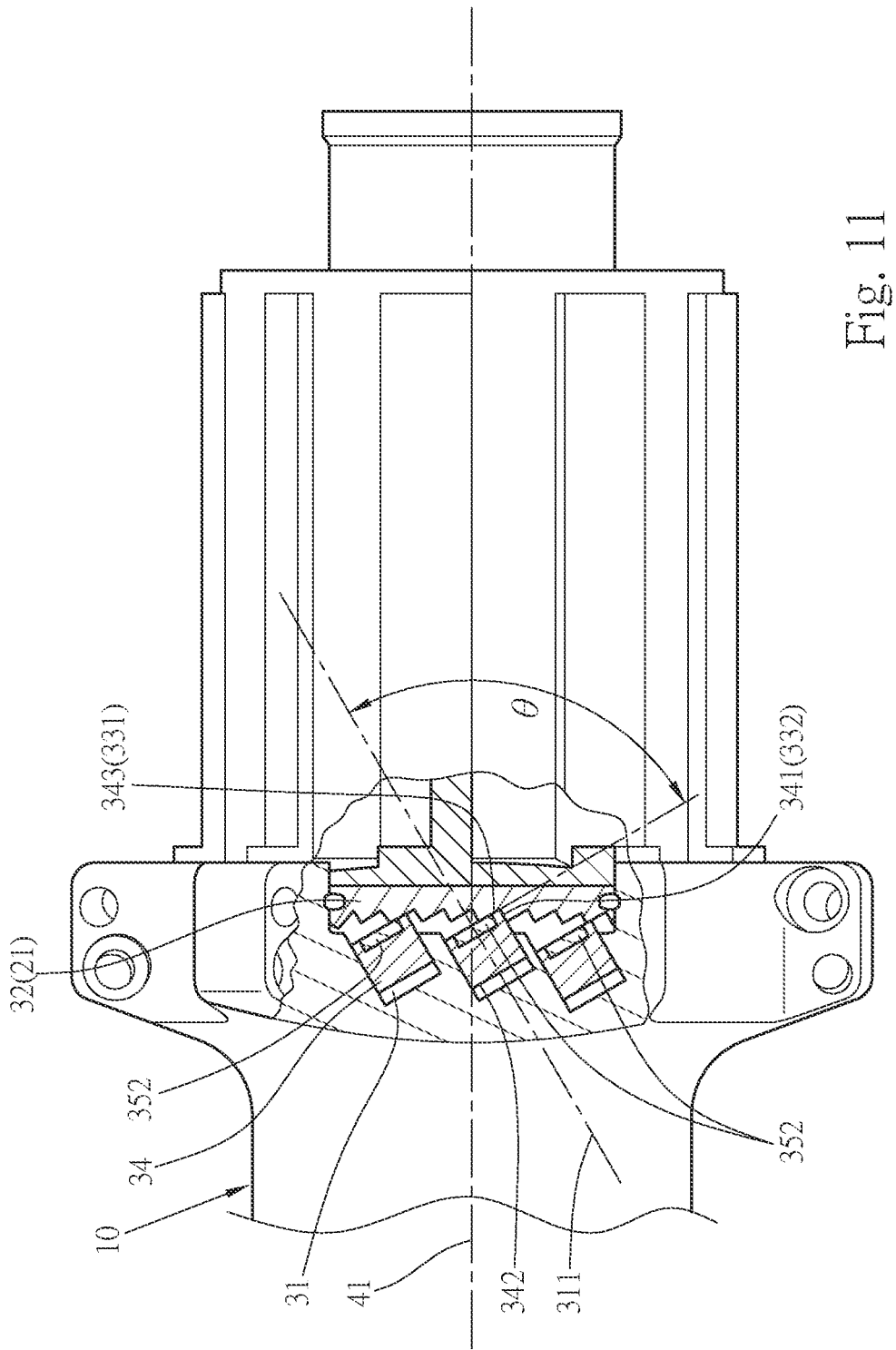
FIG. 11 is another cross sectional view showing the assembly of the freehub of the bicycle according to the second embodiment of the present invention.

With reference to FIGS. 9-11, in a second embodiment, the toothed ring 32 is screwed with the accommodation holder 21, the respective resilient element 35 is a magnetic element 352 and is fixed on the respective engagement element 34, wherein the toothed ring 32 is made of metal so that the respective magnetic element 352 attracts the toothed ring 32 magnetically, and the respective engagement element 34 moves to the respective tooth 33 linearly.

The receiving sleeve 21 has male threads formed thereon, and the toothed ring 32 has female threads formed thereon so as to screw with the male threads.

The respective resilient element 35 pushes the respective engagement element 34 magnetically so the respective engagement element 34 moves to the toothed ring 32 linearly. When the respective engagement element 34 engages with the arcuate face 331 of the respective tooth 33, the receiving sleeve 21 and the body 10 revolve forward. When the respective engagement element 34 removes from the respective tooth 33, the respective engagement element 34 does not engage with the arcuate face 331 of the respective tooth 33, and the respective engagement element 34 rotates idly, hence the body 10 keeps rotation. Alternatively, when the respective engagement element 34 engages with the respective tooth 33, the body 10 is driven to revolve backward so as to actuate the receiving sleeve 21 and the body 10 to move backward.

Figure 12:
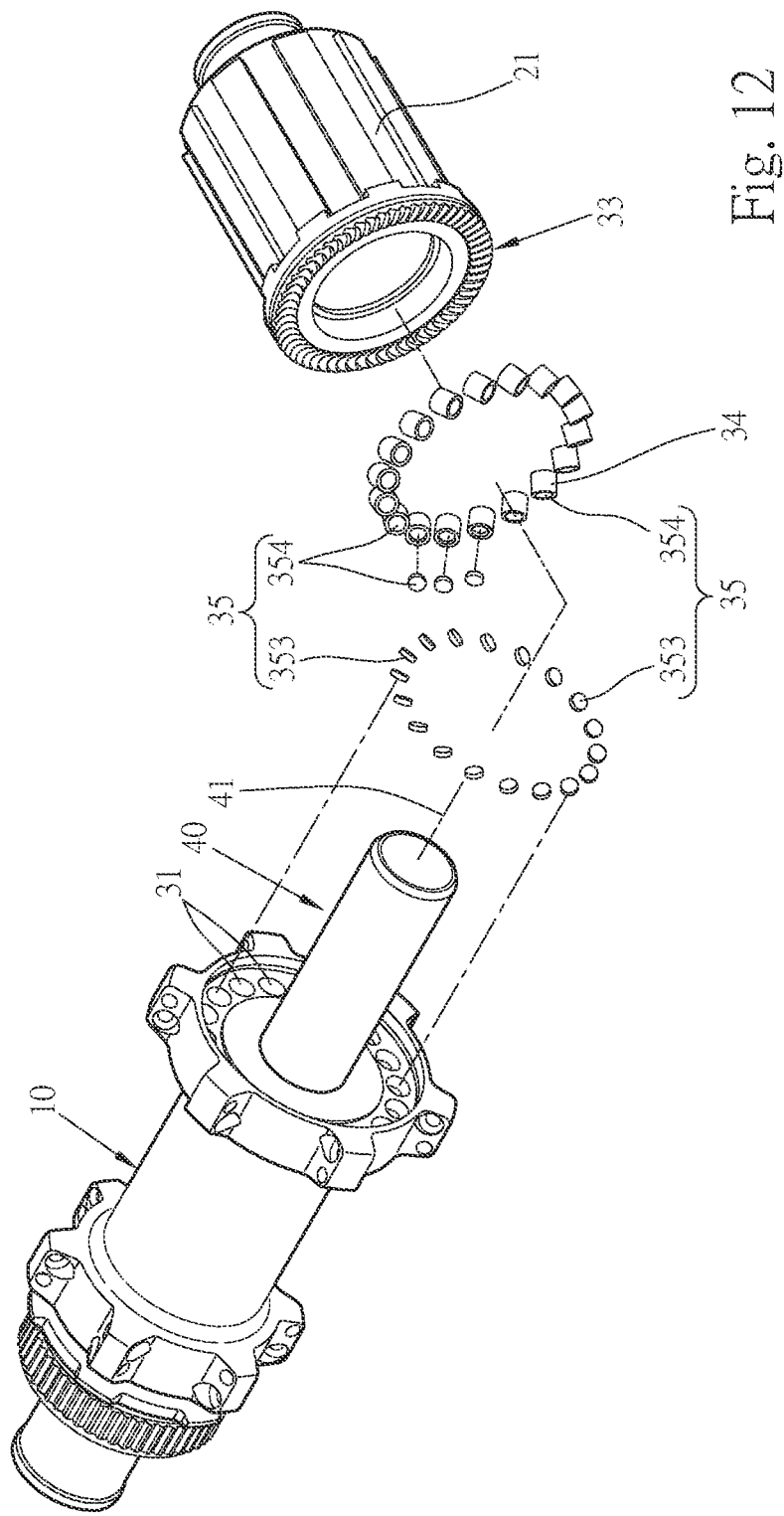
FIG. 12 is a perspective view showing the exploded components of a freehub of a bicycle according to a third embodiment of the present invention.
Figure 13:
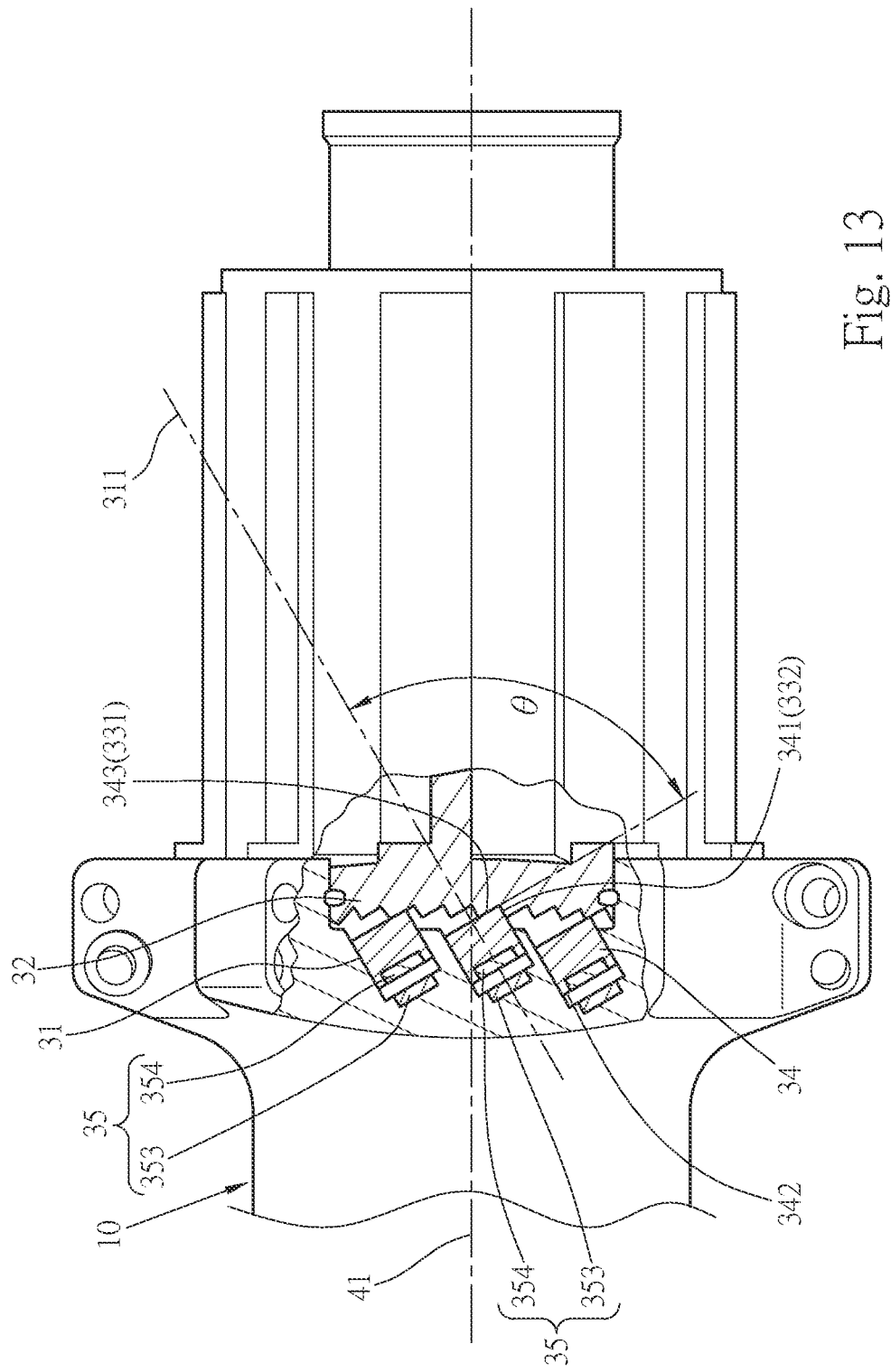
FIG. 13 is a cross sectional view showing the operation of the freehub of the bicycle according to the third embodiment of the present invention.

With reference to FIGS. 12 and 13, in a third embodiment, the toothed ring 32 is integrally connected with the receiving sleeve 21. The respective resilient element 35 includes a first magnetic protrusion 353 received in the respective chute 31, and the respective resilient element 35 includes a second magnetic protrusion 354 fixed on the respective engagement element 34 of the respective chute 31, wherein the first magnetic protrusion 353 repels the second magnetic protrusion 354 magnetically, such that the respective engagement element 34 moves to the respective tooth 33 automatically.

The respective tooth 33 is integrally formed in the receiving sleeve 21, and the first magnetic protrusion 353 repels the second magnetic protrusion 354 magnetically so that the respective resilient element 35 pushes the respective engagement element 34 to move toward the toothed ring 32 linearly.

While the preferred embodiments of the invention have been set forth for purpose of disclosure, modifications of the disclosed embodiments of the invention and other embodiments thereof may occur to those skilled in the art. Accordingly, the appended claims are intended to cover all embodiments which do not depart from the spirit and scope of the invention.

What is claimed is:

1. A freehub of a bicycle comprising:
a body fitted and rotating on a rotary shaft;
a receiving sleeve connected with a first end of the body and fitted on the rotary shaft, the receiving sleeve including an accommodation holder configured to accommodate a freewheel and a fixing element corresponding to a second end of the body, the fixing element being formed in a polygon shape;
a ratchet assembly mounted between the body and the receiving sleeve, and the ratchet assembly including multiple chutes defined thereon and corresponding to the body, wherein a central axis of a respective chute is not parallel to a central axis of the rotary shaft;
a toothed ring fitted between the fixing element and the body and having a polygonal orifice defined on a center thereof fitted with the fixing element, and the ratchet assembly further including multiple teeth formed on the toothed ring opposite to the multiple chutes, wherein each respective tooth has an arcuate face;
the ratchet assembly further including multiple engagement elements formed in a column shape and corresponding to the multiple teeth, such that the multiple engagement elements abut against the multiple teeth, when the multiple engagement elements engage with the multiple teeth;
the ratchet assembly further including multiple resilient elements, wherein a respective resilient element abuts against the respective chute and a respective engagement element, such that the respective engagement element is urged by the respective resilient element to linearly move toward the respective tooth so as to engage with the respective tooth.

2. The freehub as claimed in claim 1, wherein when the respective engagement element engages with the respective tooth, the accommodation holder rotates in a predetermined direction to actuate the fixing element, the toothed ring, and the body to rotate in a same direction; when the receiving sleeve rotates in an opposite direction, the fixing element and the toothed ring revolve in the opposite direction simultaneously therewith, and the respective tooth of the toothed ring does not engage with the respective engagement element and the toothed ring rotates idly.

3. The freehub as claimed in claim 1, wherein each respective tooth has the arcuate face and a tilted face connected with a first resilient element face, when the respective engagement element contacts with the tilted face and rotates toward a non-driving direction, the respective engagement element does not engage but rotates idly so that the tilted face pushes the respective engagement to the respective chute linearly.

4. The freehub as claimed in claim 3, wherein the respective engagement element has a peripheral fringe, a first edge, and a second edge opposite to the first edge, wherein the first edge of the respective engagement element contacts with the respective resilient element, and the second edge and a part of the peripheral fringe are exposed outside the respective chute; when the respective engagement element engages with the respective tooth, the part of the peripheral fringe exposed outside the respective chute contacts with the respective arcuate face, and the second edge exposed outside the respective chute abuts against the tilted face.

5. The freehub as claimed in claim 3, wherein the respective chute has a linear direction defined on a central axis thereof, and the linear direction of the respective chute is a linear moving direction of the respective engagement element, wherein an inclined angle θ is defined between the linear moving direction of the respective engagement element and the tilted face of the respective chute.

6. The freehub as claimed in claim 5, wherein the inclined angle θ is 90 degrees.

7. The freehub as claimed in claim 1, wherein the respective resilient element is a spring.

8. The freehub as claimed in claim 1, wherein each respective resilient element is a magnetic element and is fixed on a corresponding respective engagement element, wherein the toothed ring is made of metal so that the respective magnetic element is attracted to the toothed ring magnetically, and the respective engagement element moves to the respective tooth linearly.

9. The freehub as claimed in claim 1, wherein each respective resilient element includes a first magnetic protrusion received in a corresponding respective chute and a second magnetic protrusion fixed on a corresponding respective engagement element of the respective chute, wherein the first magnetic protrusion repels the second magnetic protrusion magnetically, such that the respective engagement element moves to the respective tooth automatically.

10. A freehub of a bicycle comprising:
a body fitted and rotating on a rotary shaft;
a receiving sleeve connected with a first end of the body and fitted on the rotary shaft, the receiving sleeve including an accommodation holder configured to accommodate a freewheel and a fixing element corresponding to a second end of the body;
a ratchet assembly mounted between the body and the receiving sleeve, and the ratchet assembly including multiple chutes defined thereon and corresponding to the body, wherein a central axis of a respective chute is not parallel to a central axis of the rotary shaft;
a toothed ring fitted between the fixing element and the body and being threadedly engaged with the accommodation holder, the toothed ring including multiple teeth formed thereon opposite to the multiple chutes, wherein each respective tooth has an arcuate face;
the ratchet assembly further including multiple engagement elements formed in a column shape and corresponding to the multiple teeth, such that the multiple engagement elements abut against the multiple teeth, when the multiple engagement elements engage with the multiple teeth;
the ratchet assembly further including multiple resilient elements, wherein a respective resilient element abuts against the respective chute and a respective engagement element, such that the respective engagement element is urged by the respective resilient element to linearly move toward the respective tooth so as to engage with the respective tooth.

11. The freehub as claimed in claim 10, wherein each respective resilient element is a magnetic element and is fixed on a corresponding respective engagement element, wherein the toothed ring is made of metal so that the respective magnetic element is attracted to the toothed ring magnetically, and the respective engagement element moves to the respective tooth linearly.

12. The freehub as claimed in claim 10, wherein each respective resilient element includes a first magnetic protrusion received in a corresponding respective chute and a second magnetic protrusion fixed on a corresponding respective engagement element of the respective chute, wherein the first magnetic protrusion repels the second magnetic protrusion magnetically, such that the respective engagement element moves to the respective tooth automatically.

13. A freehub of a bicycle comprising:
a body fitted and rotating on a rotary shaft;
a receiving sleeve connected with a first end of the body and fitted on the rotary shaft, the receiving sleeve including an accommodation holder configured to accommodate a freewheel;
a ratchet assembly mounted between the body and the receiving sleeve, and the ratchet assembly including multiple chutes defined thereon and corresponding to the body, wherein a central axis of a respective chute is not parallel to a central axis of the rotary shaft;
a toothed ring fitted between the fixing element and the body, and the ratchet assembly further including multiple teeth formed on the toothed ring opposite to the multiple chutes, wherein a respective tooth has an arcuate face;
the ratchet assembly further including multiple engagement elements formed in a column shape and corresponding to the multiple teeth, such that the multiple engagement elements abut against the multiple teeth, when the multiple engagement elements engage with the multiple teeth;
the ratchet assembly further including multiple resilient elements, wherein a respective resilient element abuts against the respective chute and a respective engagement element, such that the respective engagement element is urged by the respective resilient element to linearly move toward the respective tooth so as to engage with the respective tooth, each respective resilient element is a magnetic element and is fixed on a corresponding engagement element, wherein the toothed ring is made of metal so that the respective magnetic element is attracted to the toothed ring magnetically, and the respective engagement element moves to the respective tooth linearly.

14. The freehub as claimed in claim 13, wherein the receiving sleeve also includes a fixing element corresponding to a second end of the body and formed in a polygon shape, and the toothed ring has a polygonal orifice defined on a center thereof and fitted with the fixing element.

15. The freehub as claimed in claim 13, wherein the toothed ring is threadedly engaged with the accommodation holder.

16. A freehub of a bicycle comprising:
a body fitted and rotating on a rotary shaft;
a receiving sleeve connected with a first end of the body and fitted on the rotary shaft, the receiving sleeve including an accommodation holder configured to accommodate a freewheel;
a ratchet assembly mounted between the body and the receiving sleeve, and the ratchet assembly including multiple chutes defined thereon and corresponding to the body, wherein a central axis of a respective chute is not parallel to a central axis of the rotary shaft;
a toothed ring fitted between the fixing element and the body, and the ratchet assembly further including multiple teeth formed on the toothed ring opposite to the multiple chutes, wherein a respective tooth has an arcuate face;
the ratchet assembly further including multiple engagement elements formed in a column shape and corresponding to the multiple teeth, such that the multiple engagement elements abut against the multiple teeth, when the multiple engagement elements engage with the multiple teeth;
the ratchet assembly further including multiple resilient elements, wherein a respective resilient element abuts against the respective chute and a respective engagement element, such that the respective engagement element is urged by the respective resilient element to linearly move toward the respective tooth so as to engage with the respective tooth, each respective resilient element includes a first magnetic protrusion received in a corresponding respective chute and a second magnetic protrusion fixed on a corresponding respective engagement element of the respective chute, wherein the first magnetic protrusion repels the second magnetic protrusion magnetically, such that the respective engagement element moves to the respective tooth automatically.

17. The freehub as claimed in claim 16, wherein the receiving sleeve also includes a fixing element corresponding to a second end of the body and formed in a polygon shape, and the toothed ring has a polygonal orifice defined on a center thereof and fitted with the fixing element.

18. The freehub as claimed in claim 16, wherein the toothed ring is threadedly engaged with the accommodation holder.

* * * * *